June 5, 1956 — B. J. BITTNER — 2,749,520
DIRECTIONAL COUPLING MEANS FOR TRANSMISSION LINES
Filed Nov. 4, 1952 — 2 Sheets-Sheet 1

INVENTOR.
Burt J. Bittner
BY
Roland A. Anderson
Attorney

June 5, 1956            B. J. BITTNER            2,749,520

DIRECTIONAL COUPLING MEANS FOR TRANSMISSION LINES

Filed Nov. 4, 1952            2 Sheets-Sheet 2

INVENTOR.
Burt J. Bittner
BY

United States Patent Office 2,749,520
Patented June 5, 1956

2,749,520

DIRECTIONAL COUPLING MEANS FOR TRANSMISSION LINES

Burt J. Bittner, Sandia Base, N. Mex., assignor to the United States of America as represented by the United States Atomic Energy Commission Application November 4, 1952, Serial No. 318,702

3 Claims. (Cl. 333—10)

The present invention relates generally to directional coupling means and more particularly to a directional coupling device adapted to be utilized for coupling together high frequency transmission lines such as coaxial conductors or wave guides.

The invention aims to provide improved means adapted to be utilized for more efficiently and effectively achieving relatively high directivity coupling between coaxial conductors, and relatively broad band width.

An object of the present invention is to provide new and improved means for coupling together transmission lines.

An object of the invention is to provide improved transmission line coupling means of relatively simple and inexpensive construction.

Another object of the invention is to provide improved coupling means particularly useful with transmission lines such as coaxial conductors.

Another object of the invention is to provide improved coupling means adapted to provide high directivity and broad band width coverage.

Still another object of the invention is to provide improved directional coupling means adapted to handle high power.

A still further object of the invention is to provide an improved directional coupler utilizing probes for connecting E field vectors and slots for connecting H field vectors between conductors or guides.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description. The preferred embodiment illustrated is not intended to be exhaustive nor to limit the invention to the precise form disclosed. It is chosen and described in order to best explain the principles of the invention and their application in practical use to thereby enable others skilled in the art to best utilize the invention in various embodiments and modifications as are best adapted to the particular use contemplated.

In the accompanying drawings.

Figure 1:
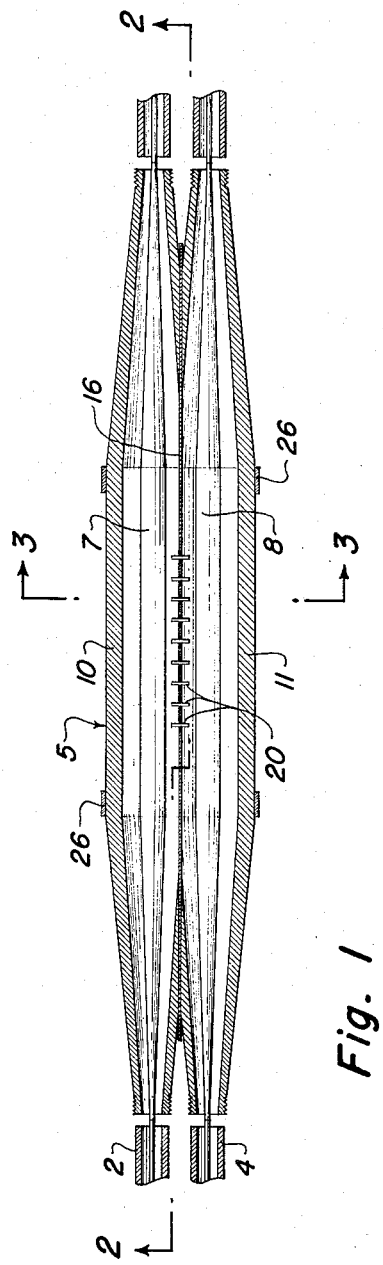
Fig. 1 is a longitudinal sectional view showing a preferred embodiment of the present invention.
Figure 2:
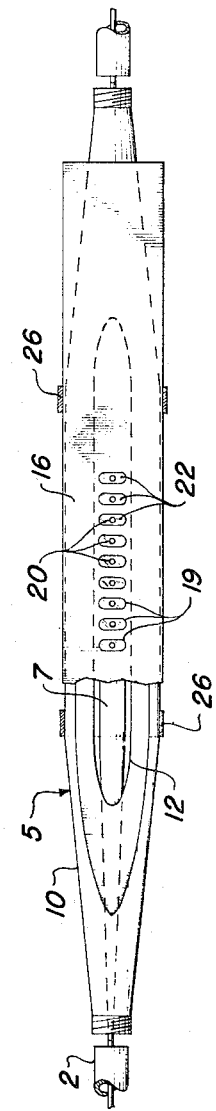
Fig. 2 is a view taken along line 2—2 of Fig. 1.
Figure 3:
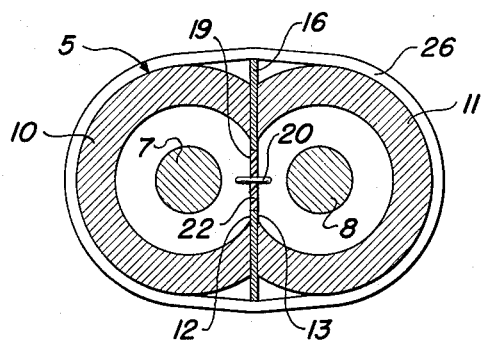
Fig. 3 is a sectional view taken along line 3—3 of Fig. 1.

The present directional coupler device 5 is shown in Figs. 1–3, associated with suitable coaxial conductors 2 and 4 which have the usual inner and outer conductors.

A load, for example, an antenna or antenna system (not shown), may be connected with similar coaxial conductors shown at the right side of coupling device 5. The coaxial lines 2 and 4 may connect with the device 5 in any suitable manner, for example, by known coaxial line connectors (not shown); in this manner coaxial line outer and inner conductors connect, respectively, with outer hollow members 10, 11 and inner conductors 7, 8 of the present directional coupler 5. The known coaxial line connectors referred to are of such construction that the inner conductors are maintained centrally disposed within the outer conductors.

In order to substantially maintain the characteristic impedance of coaxial lines 2 and 4 in the present coupler device 5, which has a central portion of greater diameter than the coaxial lines so as to facilitate incorporation of coupling elements to be hereinafter referred to, exterior surfaces of the inner conductors 7 and 8 and adjacent interior surfaces of the hollow outer members or conductors 10 and 11 are of generally corresponding taper or slope and merge with the central inner and outer conductor portions of enlarged diameter. The hollow members 10 and 11, preferably of metal such as brass, copper, aluminum or silver, cooperate with a common intermediate wall member 16, of similar metal, in encircling the inner conductors 7 and 8.

As shown, the hollow members 10 and 11 are generally tubular and each is cut away at one side to form elongate openings (12, 13 respectively) which are disposed toward each other and have their marginal portions abutting against the common wall member 16. The hollow members 10 and 11 may be formed by soldering or welding generally cylindrical central portions to tapering end portions, the central portions accommodating the coupling slots and probes to be hereinafter referred to.

The common wall member 16 has apertures or slots 19 therein spaced from each other lengthwise of the inner conductors 7 and 8 and disposed generally in alignment with longitudinal axes of the inner conductors 7 and 8. Through each of the slots projects a probe or pin 20, the probes being preferably spaced from the slot walls and retained in position by insert members 22. The insert members 22 are preferably of some low loss material such as polystyrene or polyethylene and preferably fill the slots so as to hold the probes 20 firmly in position at all times.

By the described construction one coaxial line, for example, line 2, is coupled with another coaxial line, line 4 as illustrated, so as to obtain in the secondary line high directivity and controlled coupling at relatively high frequencies. The slots and probes provide high effective coupling of the coaxial lines, particularly where more than a few of the combination slots and probes are spaced along the wall member 16. By reason of the fact that the slots and probes are positioned at identical locations, there is obtained a series and parallel coupling effect at the same location.

As illustrative of dimensions which may be employed, the interior diameter of the central portions may be about 1⅛", the diameter of the inner conductors of their central portions about ½", the common wall member 16 about .050" thick, the slots 19 therein about .475" long and .060" wide, and the spacing between slots about .400". The probes 20 may be about .030" in diameter and .120" long.

The hollow members or outer conductors 10, 11 and intermediate apertured member 16 may be held together by encircling bands 26, or in any other appropriate manner.

Figure 4:
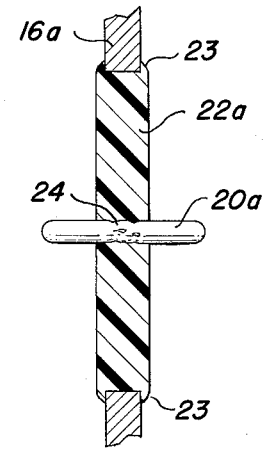
Fig. 4 is an enlarged fragmentary view showing a slightly modified form of means for retaining coupling probes in position.

If desired, the inserts which retain the probes in position may be of the configuration illustrated in the cross section of Fig. 4. As there shown, the probes 20a project through inserts 22a which have edge portions 23 overlapping marginal portions of the apertures in the wall member 16a. This construction minimizes the possibility of the inserts and probes separating from each other, also, the probes may be provided with roughened portions 24 intermediate their ends to interlock with adjacent portions of the inserts 22a and thereby further minimize the possibility of separation of probes and common wall member.

A total of nine combination coupling slots and probes along the length of the device gives excellent results, enabling coverage of the range from 400 to 4,000 megacycles. A greater number of such slots and probe "units" may be utilized to obtain even better coupling and/or higher directivity. While a lesser number of slot and probe units may be utilized, such is not generally desirable as the coupling is not as effective. It is preferred that these "units" be in substantial alignment with the longitudinal axes of the inner conductors, the longitudinal axes of slots being disposed generally transverse of the inner conductor axes as this affords best coupling between the coaxial lines. Placing the slots and probes out of such alignment decreases the coupling effect.

Figure 5:
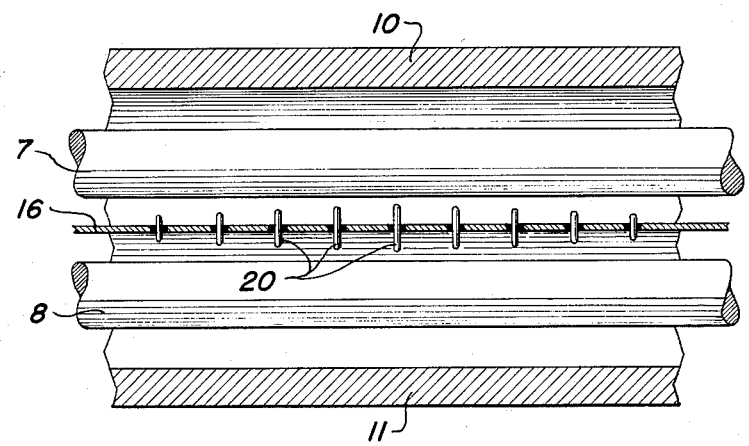
Fig. 5 is a fragmentary sectional view showing a modified form of the invention.

In some instances it may be desired to use probes of varying lengths in the coupling device, so that the distance the probes extend into the hollow members 10 and 11 varies along the length of the device, as illustrated generally in Fig. 5 wherein the probes progressively increase and then decrease in length.

It will be seen that the present invention provides a new and improved directional coupling device which is a relatively simple and inexpensive construction and which is adapted to provide high directivity and controlled coupling at relatively high frequencies. The device may be readily manufactured by soldering or welding a suitable central portion to tapering end portions; longitudinal portions of the thus formed elements may be readily cut away so that a plurality of them may be abutted against opposite sides of a common plate or wall member that is provided along its length with a plurality of spaced slot and probe "units." The slots in the intermediate plate member may be formed by punching, drilling, or any other suitable manner and the probes may be readily positioned and retained in the slots by synthetic plastic inserts such as polystyrene. The coupling device will handle high power as the probes and slots are relatively small and no additional tuners are required. While the device has been described chiefly with reference to its utilization for coupling coaxial lines, it may in some instances be utilized with wave guides.

As various changes may be made in the form, construction and arrangement of the parts herein without departing from the spirit and scope of the invention and without sacrificing any of its advantages, it is to be understood that all matter herein is to be interpreted as illustrative and not in a limiting scope.

I claim:

1. Directional coupling means of the character described comprising the combination of a pair of adjacent generally tubular conducting means separated by a common conducting wall member, said common wall member having therethrough and disposed along the longitudinal axes of the tubular means a plurality of spaced apart slots with each slot having its longitudinal axis disposed generally laterally with respect to said longitudinal axes of the tubular means, and conducting probes extending through the slots of said wall member having portions extending into each of said pair of tubular means.

2. A device as claimed in claim 1, in which said probes are of progressively varying lengths along said wall member and project varying distances into said tubular means.

3. A device as claimed in claim 1, in which conductors extend longitudinally through each of the generally tubular conducting means and at locations spaced from terminal ends of said probes.

References Cited in the file of this patent

UNITED STATES PATENTS

| | | |
|---|---|---|
| 2,459,197 | Stewart | Jan. 18, 1949 |
| 2,532,317 | Lundstrom | Dec. 5, 1950 |
| 2,575,799 | Doherty | Nov. 20, 1951 |
| 2,580,678 | Hansen et al. | Jan. 1, 1952 |
| 2,580,679 | Hansen | Jan. 1, 1952 |
| 2,641,648 | Sensniper | June 9, 1953 |

OTHER REFERENCES

Proceedings of the I. R. E., vol. 37, Issue 10, pp. 1208–1211, October 1949.